United States Patent
Li et al.

(10) Patent No.: US 11,409,804 B2
(45) Date of Patent: Aug. 9, 2022

(54) DATA ANALYSIS METHOD AND DATA ANALYSIS SYSTEM THEREOF FOR SEARCHING LEARNING SECTIONS

(71) Applicant: DELTA ELECTRONICS, INC., Taoyuan (TW)

(72) Inventors: Shih-Gong Li, Taoyuan (TW); Shih-Han Chan, Taoyuan (TW); Chao-Hsuan Ko, Taoyuan (TW); Guo-Cheng Lan, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 147 days.

(21) Appl. No.: 16/529,818

(22) Filed: Aug. 2, 2019

(65) Prior Publication Data

US 2020/0081922 A1 Mar. 12, 2020

Related U.S. Application Data

(60) Provisional application No. 62/728,082, filed on Sep. 7, 2018.

(30) Foreign Application Priority Data

Feb. 1, 2019 (CN) .......................... 201910105173.2

(51) Int. Cl.
*G06F 16/903* (2019.01)
*G06F 16/2457* (2019.01)
*G06F 16/483* (2019.01)

(52) U.S. Cl.
CPC .. *G06F 16/90344* (2019.01); *G06F 16/24578* (2019.01)

(58) Field of Classification Search
CPC ............. G06F 11/1451; G06F 9/45558; G06F 16/128; G06F 2201/84; G06F 2009/45583;

(Continued)

(56) References Cited

U.S. PATENT DOCUMENTS 6,751,354 B2 6/2004 Foote et al.
7,242,809 B2 7/2007 Hunter et al.
(Continued)

FOREIGN PATENT DOCUMENTS

CN 1774717 A 5/2006
CN 101604324 A 12/2009
(Continued)

OTHER PUBLICATIONS

Sheng-syun Shen, Hung-yi Lee, Shang-wen Li, Victor Zue and Lin-shan Lee, "Structuring Lectures in Massive Open Online Courses (MOOCs) for Efficient Learning by Linking Similar Sections and Predicting Prerequisites", the 16th Annual Conference of the International Speech Communication Association (INTERSPEECH'15), Dresden, Germany, Sep. 6-10, 2015, p. 1363-1367.

(Continued)

*Primary Examiner* — Pierre M Vital
*Assistant Examiner* — Vy H Ho
(74) *Attorney, Agent, or Firm* — CKC & Partners Co., LLC

(57) ABSTRACT

The present disclosure relates to a data analysis method and a data analysis system thereof. The data analysis method includes steps of: receiving a first learning content data, and adding multiple first segmentation marks to the first learning content data to divide multiple first learning sections on the first learning content data. The first learning sections are arranged according to a time axis. Searching a first keyword string corresponding to each first learning section from the first learning sections. Receiving a analysis command, and analyzing the analysis command with the first keyword string of each of the first learning content data to obtain multiple first similarities, corresponding to the analysis command and each of the first learning sections. Finally, (Continued)

searching for the first learning section with the highest similarity.

19 Claims, 4 Drawing Sheets

(58) Field of Classification Search
CPC .............. G06F 2201/815; G06F 16/188; G06F 11/1448; G06F 11/1464; G06F 11/1484; G06F 16/90; G06F 16/24; G06F 16/90344; G06F 16/24578; G06F 16/45; G06F 16/483; G06F 16/75; G06F 16/783; G06Q 50/20
See application file for complete search history.

(56) References Cited

U.S. PATENT DOCUMENTS

| | | | |
|---|---|---|---|
| 7,596,549 B1* | 9/2009 | Issa | G06F 16/48 |
| 8,667,521 B2 | 3/2014 | Vandermolen et al. | |
| 9,342,601 B1* | 5/2016 | Finkelstein | G06F 16/3322 |
| 10,909,196 B1* | 2/2021 | Suzuki | G06F 16/9535 |
| 2008/0226173 A1 | 9/2008 | Yuan et al. | |
| 2010/0057644 A1* | 3/2010 | Barton | G06F 16/78 |
| | | | 704/235 |
| 2011/0055040 A1* | 3/2011 | Foster | G06Q 30/0633 |
| | | | 705/26.7 |
| 2012/0173577 A1 | 7/2012 | Millar et al. | |
| 2013/0226930 A1 | 8/2013 | Arngren et al. | |
| 2015/0286718 A1* | 10/2015 | Wang | G06F 16/951 |
| | | | 707/738 |
| 2015/0339380 A1* | 11/2015 | Zhang | G06F 16/24578 |
| | | | 707/769 |
| 2018/0032910 A1 | 2/2018 | Shibahara | |
| 2018/0107663 A1* | 4/2018 | Lewis | G06F 16/738 |
| 2018/0373724 A1* | 12/2018 | Novak | G06F 3/048 |

FOREIGN PATENT DOCUMENTS

| | | |
|---|---|---|
| CN | 104572716 A | 4/2015 |
| CN | 107256262 A | 10/2017 |
| JP | 2005-301856 A | 10/2005 |
| JP | 2005-310094 A | 11/2005 |
| JP | 2008-176538 A | 7/2008 |
| JP | 2009-104396 A | 5/2009 |
| JP | 2010-257001 A | 11/2010 |
| JP | 2011-14032 A | 1/2011 |
| JP | 2012-038239 A | 2/2012 |
| JP | 2015-201185 A | 11/2015 |
| TW | I270831 B | 1/2007 |
| TW | I513286 B | 12/2015 |
| TW | I559772 B | 11/2016 |
| TW | I571756 B | 2/2017 |
| WO | 2008/023470 A1 | 2/2008 |

OTHER PUBLICATIONS

Fujii A et al: "LODEM: A system for on-demand video lectures" Speech Communication. Elsevier Science Publishers, Amsterdam. NL. vol. 48 No. 1 May 2006 (May 1, 2006), pp. 516-531, XP027926237, ISSN:0167-6393 [retrieved on May 1, 2006].

* cited by examiner

DATA ANALYSIS METHOD AND DATA ANALYSIS SYSTEM THEREOF FOR SEARCHING LEARNING SECTIONS

CROSS-REFERENCE TO RELATED APPLICATION

This application claims priority to U.S. Provisional Application Ser. No. 62/728,082, which is filed on Sep. 7, 2018, and priority to China Application Serial Number 201910105173.2, which is filed on filed Feb. 1, 2019, the disclosures of which are incorporated herein by reference in their entireties.

BACKGROUND

Technical Field

The present disclosure relates to a data analysis method and a data analysis system thereof, which configured to search corresponding learning content data according to an analysis command.

Description of Related Art

"Online Learning Platform" is a network service that stores a large amount of learning content data in a server, allowing users to connect to the server via the Internet to view the learning content data at any time. At present, the types of learning content data provided by various online learning platforms include videos, audio, presentation, documents or discussion forums, and the like.

Since the amount of learning content data stored in the online learning platform is very large, the user needs to input a search command according to his/her own needs in order to find related learning content data from the online learning platform. Therefore, the online learning platform still needs improvement.

SUMMARY

One aspect of the present disclosure is a data analysis method, including the following steps. Receiving a first learning content data. Adding multiple first segmentation marks to the first learning content data to divide multiple first learning sections on the first learning content data. Generating a first keyword string corresponding to each of the multiple first learning sections according to each of the multiple first learning sections. Receiving an analysis command related to an user operation. Analyzing the analysis command with the first keyword string of each of the multiple first learning sections to obtain multiple first similarities between the analysis command and the corresponding each of the plurality of first learning sections. Searching one of the multiple first learning sections with a highest similarity from the multiple first learning sections.

Another aspect of the present disclosure is a data analysis system, including a first server, a data storage device and a second server. The first server is configured to receive a first learning content data. The data storage device is configured to receive and storage the first learning content data from the first server. The second server is configured to add multiple first segmentation marks to the first learning content data to divide multiple first learning sections on the first learning content data, and generate a first keyword string corresponding to each of the multiple first learning sections according to each of the multiple first learning sections. The second server is further configured to receive an analysis command related to an user operation and analyze the analysis command with the first keyword string of each of the multiple first learning sections to obtain multiple first similarities between the analysis command and the corresponding each of the multiple first learning sections. The second server is further configured to search one of the multiple first learning sections with a highest similarity from the multiple first learning sections.

Accordingly, since the data analysis system can add the first segmentation mark to the first learning content data, and after dividing the first learning sections, the first keyword string is generated on each of the first learning sections, when the user logs in to the data analysis system, each first learning section of the first learning content data can be accurately retrieved, or the data analysis system can actively recommend a suitable learning section to the user to improve the operating experience of the user.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

For the embodiment below is described in detail with the accompanying drawings, embodiments are not provided to limit the scope of the present disclosure. Moreover, the operation of the described structure is not for limiting the order of implementation. Any device with equivalent functions that is produced from a structure formed by a recombination of elements is all covered by the scope of the present disclosure. Drawings are for the purpose of illustration only, and not plotted in accordance with the original size.

It will be understood that when an element is referred to as being "connected to" or "coupled to", it can be directly connected or coupled to the other element or intervening elements may be present. In contrast, when an element to another element is referred to as being "directly connected" or "directly coupled," there are no intervening elements present. As used herein, the term "and/or" includes an associated listed items or any and all combinations of more.

Currently, when a user inputs a search command in the online learning platform, the server only compares the search command with the file name, subtitles or tag (e.g., message) of the learning content data. However, if the content of the learning content data is too large (e.g., a movie with a length of two hours), the user still needs to manually adjust the learning content data (e.g., adjust the timeline to the 45 minute) to find out the section most relevant to his/her own needs. In other words, the analysis mechanism of the online learning platform can only search for names or subtitles, and cannot perform detailed retrieval according to requirements. In addition to active search, users cannot find the learning content data that matches their interests.

Figure 1:
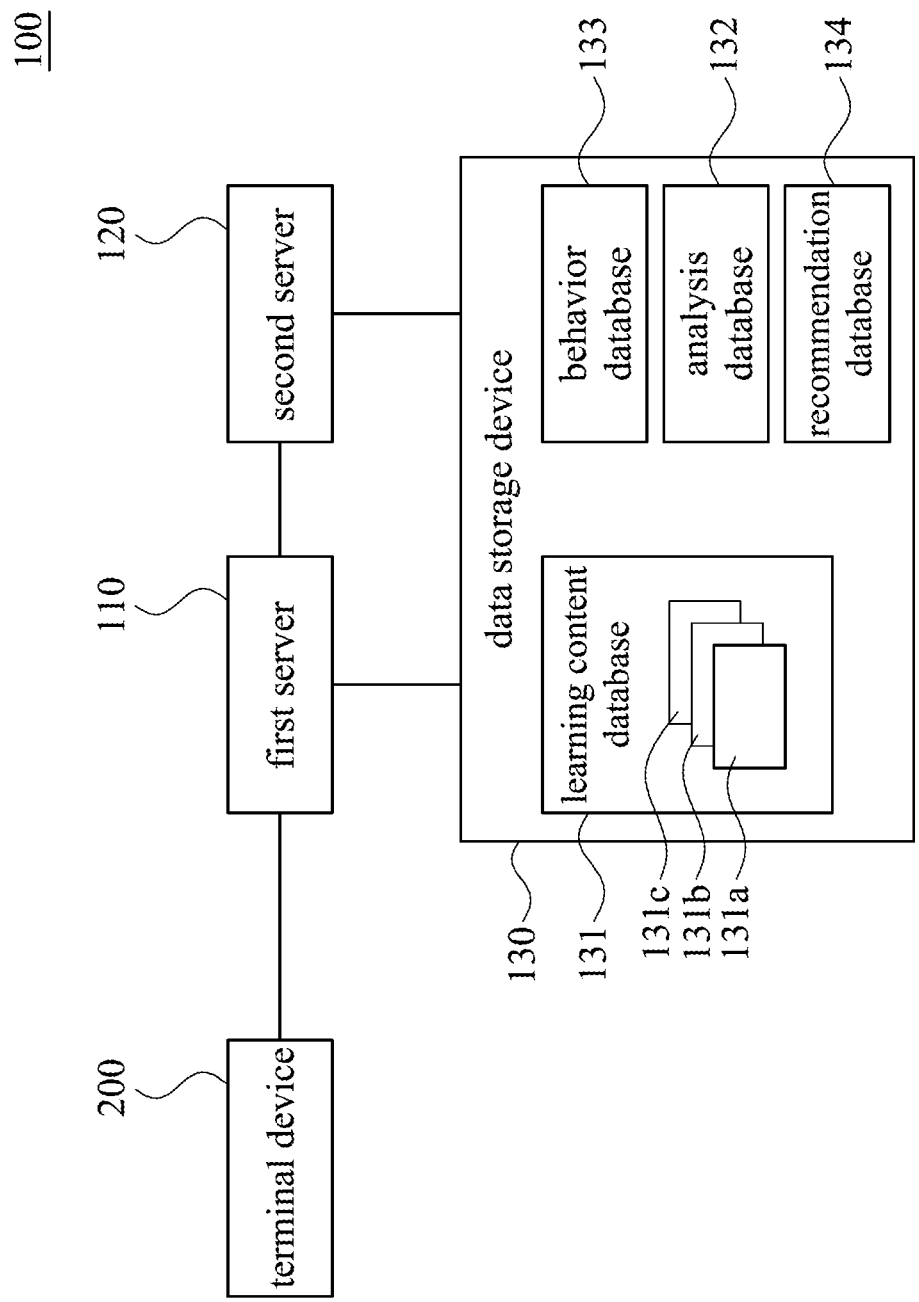
FIG. 1 is a schematic diagram of a data analysis system in some embodiments of the present disclosure.

FIG. 1 is a schematic diagram of a data analysis system in some embodiments of the present disclosure. The present disclosure is related to a data analysis system. The data analysis system 100 includes a first server 110, a second server 120, and a data storage device 130. In this embodiment, the first server 110 is electrically connected to the second server 120. In other embodiments, the first server 110 and the second server 120 can establish a connection via the network for data transmission. The data storage device 130 is, for example, flash memory, memory card, hard disk, and the like. In some embodiments, the data storage device 130 is stored in a server, independent of the first server 110 and the second server 120. In other embodiments, the data storage device 130 can be located in the first server 110 or the second server 120. In other embodiments, the first server 110 and the second server 120 may also be integrated into a single server.

In this embodiment, the data analysis system 100 is used to provide an online learning service. For example, a user can connect to the first server 110 via a terminal device 200 (e.g., a personal computer, a laptop or a smart phone) to browse a online learning interface. When the user wants to browse the learning content, the first server 110 can obtain the corresponding file from the data storage device 130 via a processor therein. The second server 120 is used to perform classification, management, and statistics functions via a processor therein. However, the application of the present disclosure is not limited thereto, and the data analysis system 100 can also be applied to a video streaming platform or a web discussion forum.

The first server 110 is used to receive multiple learning content data. In some embodiments, the first server 110 receives the learning content data from the terminal device 200 via the Internet. The learning content data may be a movie, sound, presentation or discussion thread. For convenience of explanation, in the present embodiment, a plurality of learning content data are subdivided into a first learning content data 131*a*, a second learning content data 131*b*, and a third learning content data 131*c*. However, the disclosure is not limited thereto, and the amount of learning content data can be adjusted.

In some embodiments, when the first server 110 receives the first learning content data 131*a* from the terminal device 200, the first server 110 transmits the first learning content data 131*a* to the data storage device 130. At the same time, the first server 110 transmits a notification message to the second server 120. The second server 120 is connected to the data storage device 130 to add multiple first segmentation marks to the first learning content data 131*a*, so that the first learning content data 131*a* can be divided into multiple first learning sections according to the first segmentation marks. In some embodiments, the first learning sections are arranged according to a time axis and linked to each other (e.g., a time axis is set in the first learning content data 131*a*).

For example, if the first learning content data 131*a* is a 30-minute video file, the second server 120 respectively adds two first segmentation marks at the time in the video file is 10 minutes and 20 minutes, so that the video file is divided into three first learning sections. Similarly, if the first learning content data is a 10-page presentation file, the second server 120 respectively adds three first segmentation marks on pages 2, 5, and 7, to divide the presentation file into four learning sections. In other embodiments, the first learning sections may not be connected to each other, but only have a sequence. For example, the first learning section is the first to 20th minute of the video file, and the second learning section is the 30th to 45th minute of the video file.

In some embodiments, the segmentation mark is an identification tag or an identifier for adding to the first learning content data 131*a*, so that the first server 110 or the second server 120 quickly finds a specific part of the first learning content data 131*a*, but the form of the segmentation mark is not limited thereto. The generation of the segmentation mark will be detailed later.

After the second server 120 adds the first segmentation marks to the first learning content data 131*a*, the second server 120 analyzes each first learning section to obtain a first keyword string. In some embodiments, the first keyword string includes at least one keyword. For example, for a video file that is divided into three first learning sections, the keyword string for each first learning section may be "projector, image, principle", "high-frequency signal, sharpening, enhancement" and "enhancement, clarity". In some embodiments, the first keyword string may be the literal content whose amount is higher than a set value in each first learning section. The analysis of the first keyword string will be detailed later.

The second server 120 is used to store the first learning content data and the corresponding first segmentation mark and the corresponding first keyword string into the data storage device 130. In some embodiments, the first server 110 stores the first learning content data 131*a* in an learning content database 131 in the data storage device 130. When the second server 120 generates the first segmentation marks and generates the first keyword string, the second server 120 stores the first segmentation marks and the first keyword string in an analysis database 132 of the data storage device 130. In other embodiments, the second server 120 also stores a first identification code corresponding to the first learning content data in the analysis database 132, so that the first segmentation marks and the first keyword string may correspond to the first learning content data in the learning content database 131 according to the first identification code.

The data analysis system 100 of the present disclosure may recommend a suitable learning content data to the user based on an analysis command related to the user operation. In some embodiments, the first server 110 is used to transmit an analysis command to the second server 120. Next, the second server 120 connects to the data storage device 130 according to the analysis command, and analyze the analysis command with the first keyword string of each first learning section to obtain a similarity between the analysis command and the first keyword string corresponding to each first learning sections. The second server 120 searches a first learning section with a highest similarity from the plurality of first learning sections, and integrates the searched first learning section into an analysis message, then, transmits a analysis message to the terminal device 200 to display a search screen or recommended screen on the terminal device 200.

The manner and timing of the analysis command are described below. In some embodiments, the analysis command is generated according to the user operation (e.g., input a search command), and the analysis command contains the first search command transmitted by the terminal device 200. For example, the first search command is a search string "projector, principle", and the keyword strings of the three first learning sections in the first learning content data 131a are "projector, image, principle", "high frequency signal, Sharpen, enhance" and "enhance, clarity." After analysis (e.g., comparing the similarity of the strings), the first keyword string of the first learning section is most similar to the search string. Therefore, the second server 120 transmits a comparison result to the terminal device 200 via the first server 110 (e.g., display a recommendation result on the user interface), so that the user knows the first learning section of the first learning content data 131a is most similar to the search command. In other embodiments, the second server 120 compares the search command with the key string of each learning section of all the learning content data 131a-131c to accurately determine a learning content data, which is most relevant to the search command, and the corresponding learning section.

In other embodiments, the user inputs a first search command via the terminal device 200. The first search command may be a colloquial literal content. For example, "What is the enhancement principle of the projector?" The second server 120 performs an analysis process to the first search command to generate a search string. In some embodiments, the second server 120 uses Natural Language Analysis Processing to analyze the search command. For example, the first search command is analyzed for search words such as "projector", "principle", and "what". Then, comparing the search string with the first keyword string of each first learning section. Those skilled in the art can understand the operation principle of Natural Language Analysis Processing, and therefore will not be further described herein.

In other embodiments, the analysis command is a recommended command that is actively generated by the data analysis system 100. That is, the first server 110 generates an analysis command according to the user operation. For example, when the first server 110 determines that the terminal device 200 is connected to the data analysis system 100 (e.g., the user logs in to the online learning system), the first server 110 generates an analysis command to actively analyze the files that the user may be interested in via the second server 120. Alternatively, when the first server 110 determines that the user operation corresponds to a default setting condition according to the user operation (e.g., the user browses the learning content data for half an hour, the user asks questions, transmits comments or tags for the learning content data), generating an analysis command.

In other embodiments, the first server 110 generates an analysis command according to the behavior data stored in the data storage device 130 after confirming that the user operation corresponds to the default setting condition. For example, the data analysis system 100 generates an analysis command based on the behavior data (e.g., the historical operation record of user) stored in the behavior database 133 of the data storage device 130. The details of behavior data will be detailed later.

In addition, in some embodiments, if the first server 110 confirms that the user operation corresponds to the default setting condition, generates the analysis command. After the second server 120 searches for the first learning section, which is closest to the analysis command, the second server 120 stores the searched first learning section into the recommendation database 134 of the data storage device 130. The first server 110 transmits the first learning section, which is stored in the recommendation database 134, to the terminal device 200 at a default setting recommended time (e.g., when the user logs in or logs out of the online learning system, or after the user browses a video file).

Accordingly, since after receiving the first learning content data 131a, the data analysis system 100 divides the first learning content data 131a into multiple first learning sections such that each first learning section has a corresponding first keyword string, when the user logs in to the data analysis system 100, the data analysis system 100 accurately provides the appropriate learning content data to the user according to the analysis command. As mentioned above, the present disclosure includes at least two application methods. First, when the user uses the data analysis system 100 for searching, in addition to searching a first learning content data 131a, which is most similar to the first search command, the data analysis system 100 also accurately searches a learning section from the first learning content data 131a, which is most similar to the first search command. Second, when the user logs in to the data analysis system 100, when the user operation corresponds to a default setting condition, the first server 110 generates an analysis command (e.g., search user usage record), and finds a corresponding first learning section according to the analysis command to recommend to the user. Accordingly, the accuracy of the data analysis system 100 in analysis and search may be greatly improved, and the user experience may be improved.

Figure 2A:
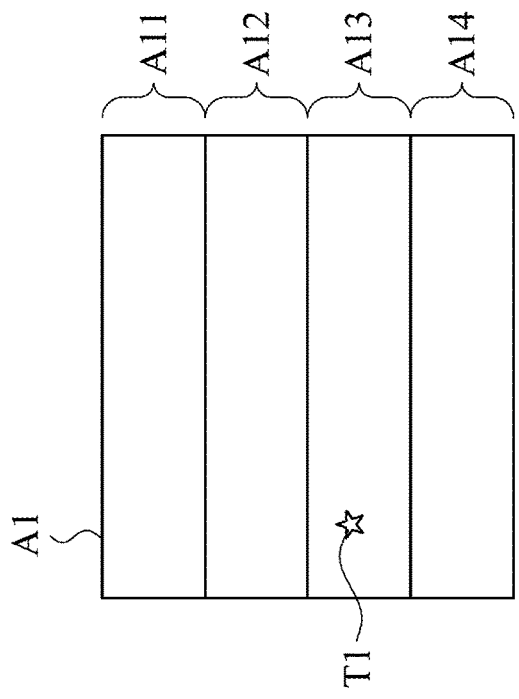
FIG. 2A is a schematic diagram of a literal data of the first learning content data in some embodiments of the present disclosure.

The following describes how the segmentation mark is generated. Please also refer to FIG. 1 and FIG. 2A, FIG. 2A is a schematic diagram of a literal data of the first learning content data in some embodiments of the present disclosure. In some embodiments, the first learning content data 131a includes a literal data A1 (e.g., subtitles). After receiving the first learning content data 131a, the second server 120 analyzes the literal data A1. For example, generate multiple feature strings by Natural Language Analysis Processing. The feature strings have a sequential relationship. Then, calculating a similarity between adjacent feature strings to generate first segmentation marks.

For example, the feature strings, which are generated by analyzing the literal data A1, include "the projector adjusts the illumination unit according to the image signal", "the light projected by the illumination unit is reflected as an image", and "in another type of projector". The first sentence "the projector adjusts the illumination unit according to the image signal" and the second sentence "the light projected by the illumination unit is reflected as an image" have the same word "image, illuminate", so the similarity is higher. The similarity of the second sentence and third sentence is lower. Therefore, when the second server 120 determines that the similarity of the adjacent feature strings is lower than a predetermined value (e.g., there is no same word at all, or one of the sentences is merely a transition statement, such as "in other embodiments . . . "), the second server 120 generates a first segmentation mark to divide the literal data A1 into multiple first learning sections A11 to A14.

In the foregoing embodiment, the feature strings are generated by using Natural Language Analysis Processing to the literal data A1 and calculating the similarity between the feature strings, but the disclosure is not limited thereto. In some embodiments, the processor in the second server 120 performs binary encoding processing to the literal data A1, and then compares the data to determine the similarity so as to establish a feature string or determine the similarity between the feature strings.

The literal data of the foregoing embodiment is the subtitles of the video file or the literal content of the presentation file. If the literal data is a discussion of a web forum, it may be segmented by the same principle. Similarly, if the first learning content data 131a includes a sound file, the second server 120 generates a literal data A1 by speech recognition, and then performs Natural Language Analysis Processing to generate multiple feature strings.

Figure 2B:
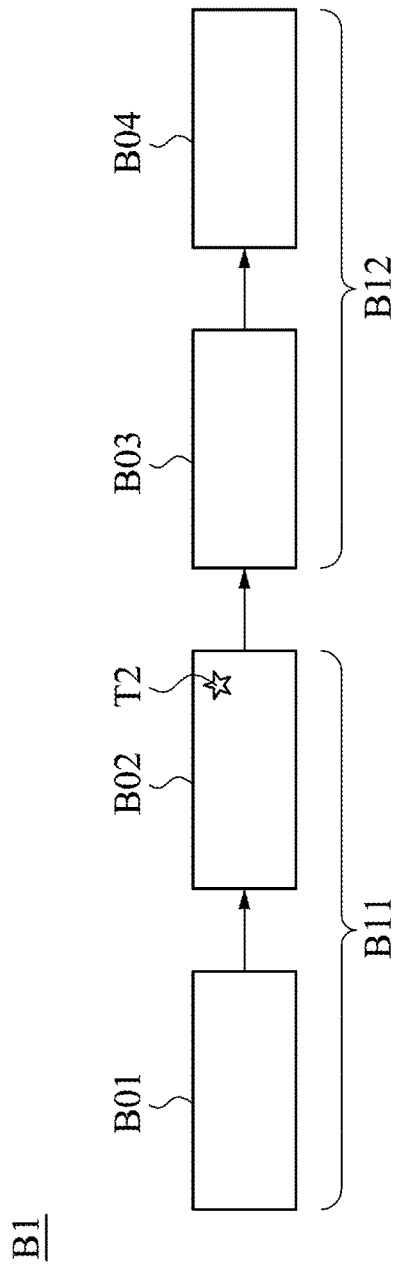
FIG. 2B is a schematic diagram of image screens of the first learning content data in some embodiments of the present disclosure.

In other partial embodiments, refer to FIG. 2B, where the first learning content data 131a includes a image file B1. The image file B1 further includes multiple image screens B01 to B04. The image screens B01 to B04 may be multiple frame images connected according to an order of the time axis of a video file. The second server 120 is configured to determine the similarity of the adjacent image screens B01 to B04 to generate first segmentation marks. For example, image screens B01 to B02 are used to display the structure diagram of the projector, and image screens B03 to B04 are used to display the path of the light projection. The similarity between image screens B02 and B03 is low, so the second server 120 adds a first segmentation mark between the image screen B02 and the image screen B03 to form two first learning sections B11 and B12.

Refer to FIG. 2A, the following describes the generating method of the first keyword string by the data analysis system 100. The second server 120 performs an analysis process (e.g., Natural Language Analysis Processing) to the literal data A1 in the first learning content data 131a to generate multiple feature words. Then, after the second server 120 generates the first segmentation marks in the foregoing manner, so that the first learning content data 131a is divided into multiple first learning sections A11 to A14 or B11 to B12, the second server 120 determines an amount of the feature words in each of the first learning sections A11 to A14 or A21 to A22. When the amount is greater than the threshold value, set the feature word in the first keyword string. For example, a first learning section A11 of the literal data A1 includes the following content: "The projector adjusts the light-emitting unit according to the image signal, and the light projected by the light-emitting unit is reflected as an image screen". "Image" appears twice, "Lighting Unit" appears twice, and "Projector, Light" appears once. The second server 120 sets the feature words "image, lighting unit", which appears over twice, in the first keyword string.

In some embodiments, if the second server 120 finds multiple matching learning content data (e.g., first learning content data 131a, second learning content data 131b all have a keyword "projector") according to the analysis command (e.g., first search command), the second server 120 further generates a search list. In other embodiments, the first server 110 is also used to provide a management interface. The management interface is used by the administrator or maintainer of the data analysis system 100 to view the internal parameters and response data of the data analysis system 100, so that the administrator or maintainer optimizes the performance of the data analysis system 100 by adjusting parameters (e.g., threshold value, semantic parameters, etc) in the data analysis system 100.

In addition, the second server 120 may adjust an order of the multiple learning content data in the search list by referring to the user behavior record. Refer to FIG. 1, in some embodiments, the data storage device 130 stores a first learning content data 131a, a second learning content data 131b and a third learning content data 131c. The second learning content data 131b may be divided into multiple second learning sections according to the multiple second segmentation marks in the foregoing manner. Each second learning section includes its own second keyword string.

Similarly, the third learning content data 131c is divided into multiple third learning sections according to the multiple third segmentation marks. Each third learning section includes its own third keyword string. When the second server 120 search a matching first learning content data 131a according to the first search command, the second server 120 transmits the searched first learning content data 131a to the terminal device 200 via the first server 110 for the user to browse. At the same time, the first server 110 or the second server 120 further generates a behavior data, and stores the behavior data in the behavior database 133 of the data storage device 130.

The behavior data is used to record the operations after the user log in to the data analysis system 100. For example, browse for specific learning content data, send messages, and mark a learning content data as important files. The data analysis system 100 sorts the search list according to the behavior data. In some embodiments, the first server 110 is used to generate an analysis command according to the behavior data. For example, the first server 110 searches for the above search string (e.g., title which appears most frequently) based on the learning content data most frequently viewed by the user to calculate the first similarities. Accordingly, even if the user does not actively input the first search command, the data analysis system 100 may periodically generate an analysis command and recommend the appropriate learning content data and the corresponding learning section.

In some embodiments, the first server 110 is further configured to receive a second search command from the terminal device 200. The second server 120 searches multiple learning content data from the data storage device 130 according to second search command. For example, the second learning content data 131b and third learning content data 131c. In some embodiments, the second server 120 compares a similarity between the second search command and the keyword string of each learning section of each of the learning content data 131a-131c, and finds out the learning section with similarity above the predetermined value. For example, the second search command is "image enhancement". In one of the second learning section of the second learning content data 131b, "image enhancement" appears 3 times. In one of the third learning section of the third learning content data 131c, "image enhancement" appears 5 times. In this case, the second server 120 lists both of the learning sections as items in the search list.

After the second server 120 searches for the second learning content data 131b and the third learning content data 131c according to the second search command, since the user has browse the first learning content data 131a before, the second server 120 further compares the first keyword string of the first learning content data 131a with the second keyword string of the second learning content data 131b and the third keyword string of the third learning content data 131c to obtain multiple second similarities. Then, adjusting an order of the second learning content data 131b and the third learning content data 131c according to the level of the second similarities to generate a search list.

For example, the keyword string of the first learning section that the user browsed the first learning content data 131a includes five keywords. The second keyword string of the second learning content data 131b analyzed and obtained by the second server 120 includes the "projector" and the other three keywords. The third keyword string of the third learning content data 131c, which searched by the second server 120 includes the "projector" and the other four keywords. The similarity between first keyword string and second keyword string is 60% (e.g., with the same three keywords). The similarity between first keyword string and third keyword string is 20% (e.g., only one keyword is the same). This means that the content of the second learning content data 131*b* is more similar to the first learning content data 131*a* that the user has previously browsed. Therefore, the second server 120 arranges the filtered second learning section of the second learning content data 131*b* before the third learning section of the third learning content data 131*c*.

In some embodiments, the data analysis system 100 further establishes a relevance between multiple learning sections. Refer to FIGS. 1, 2A and 2B. For ease of explanation, the image data B1 of FIG. 2A and the image file B1 of FIG. 2B are regarded as the contents of different learning content data. The learning section A13 includes a first relevance tag T1, and the image section B02 in the learning section B11 includes a second relevance tag T2. When the second server 120 filters out the learning section A13 according to the first search command, if the second server 120 determines that the learning section B11 includes the second dependency flag T2, the second server 120 generates the recommendation list according to the learning section B11. For example, the learning section A13 is a video file used to describe the "projector operating principle", and the learning section B11 is a presentation file used to describe the "projector structure". When the user browses the learning section A13, the data analysis system 100 may recommend the user to browse the learning section B11.

Figure 3:
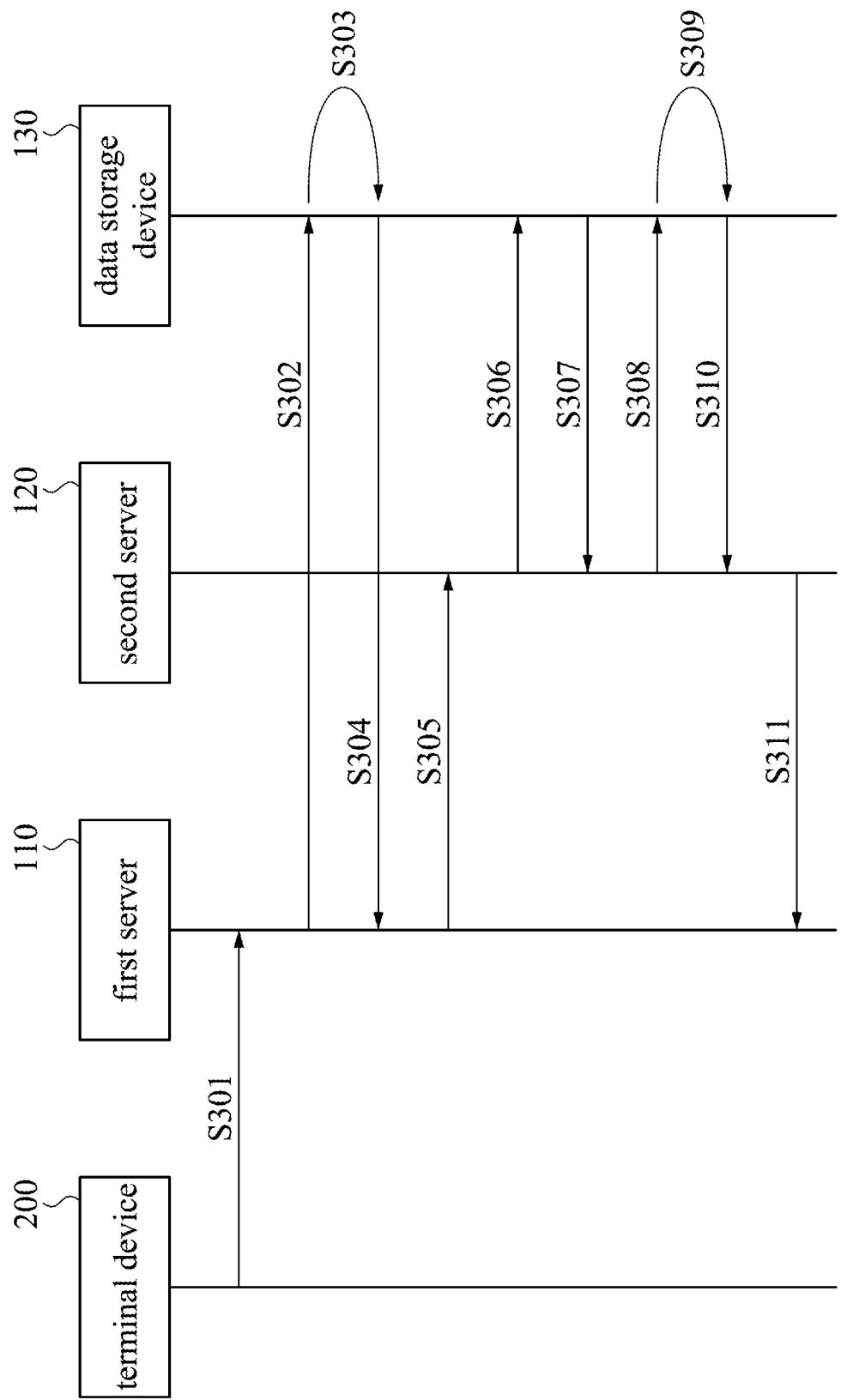
FIG. 3 is a schematic diagram of a data analysis method in some embodiments of the present disclosure.

Refer to FIG. 3, FIG. 3 is a schematic diagram of a data analysis method in some embodiments of the present disclosure. The data analysis method divides the first learning content data 131*a* and generates a first keyword string by the following steps S301 to S311. In step S301, the terminal device 200 transmits the first learning content data 131*a* to the first server 110. In step S302, the first server 110 uploads the first learning content data 131*a* to the data storage device 130. In step S303, the data storage device 130 stores the first learning content data 131*a* in the learning content database 131. In step S304, the data storage device 130 notifies the first server 110 that the storage process is completed.

In step S305, the first server 110 transmits an analysis message to the second server 120. In step S306 and step S307, the second server 120 transmits a request message to the data storage device 130 to obtain the first learning content data 131*a* from the data storage device 130. The second server 120 adds the first segmentation mark by the above method, and respectively generates a first keyword string for each first learning section. In step S308, the second server 120 uploads the first segmentation mark and the corresponding first keyword string to the data storage device 130, so that the data storage device 130 stores the first segmentation mark and the corresponding first keyword string in the analysis database 132. Then, the data storage device 130 transmits a completion message to the second server 120, and transmits the completion message to the first server 110 via the second server 120, and displays a message "the learning content data has uploaded and completed the file creation process" to the user on the interface of the online learning system.

Figure 4:
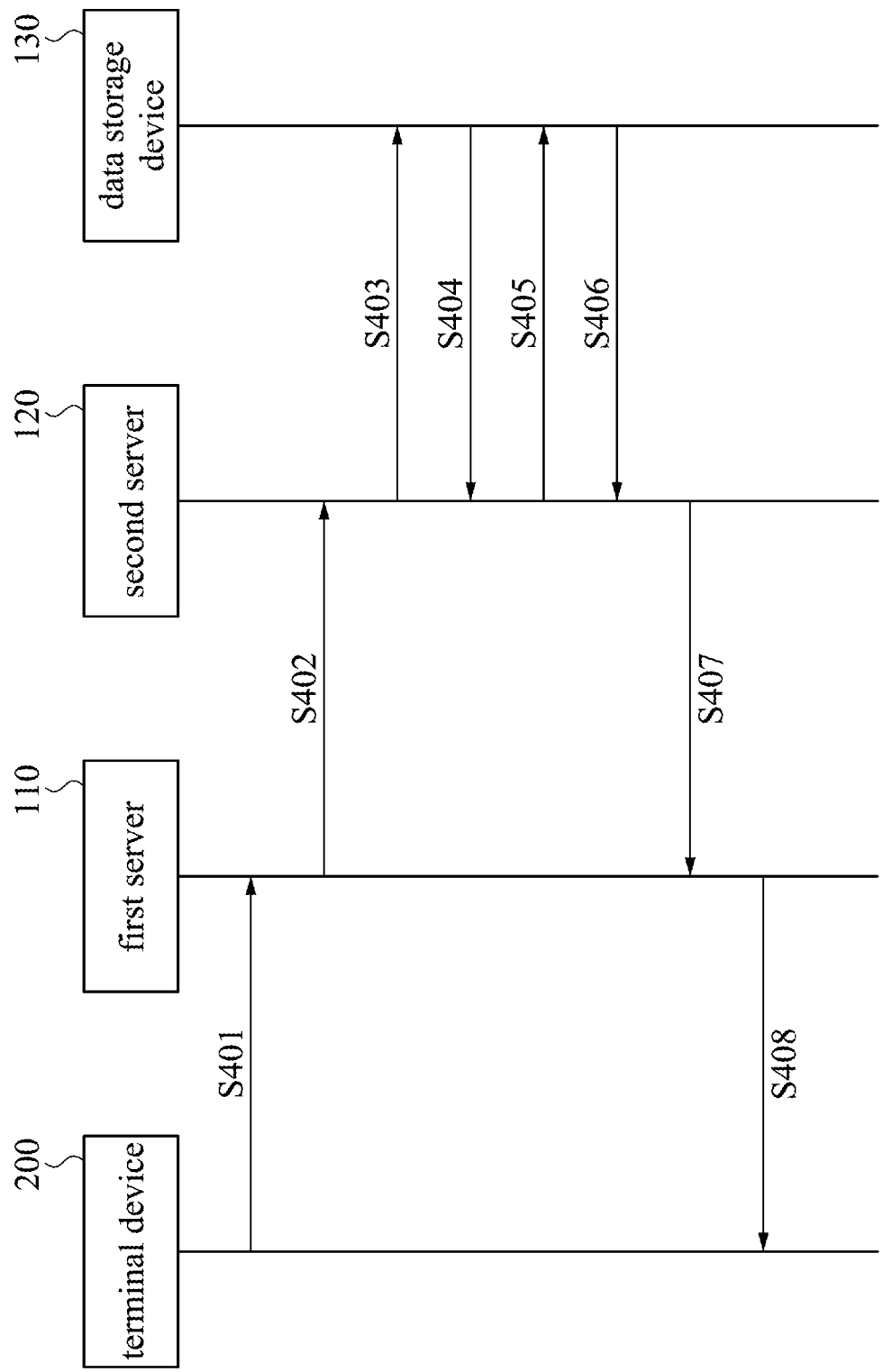
FIG. 4 is a schematic diagram of a data analysis method in some embodiments of the present disclosure.

Refer to FIG. 4, FIG. 4 is a schematic diagram of a data analysis method in some embodiments of the present disclosure. The data analysis method searches for the learning content data and the learning section according to an analysis command (e.g., a first search command) by the following steps S401 to S408. In step S401, the terminal device 200 transmits an analysis command to the first server 110. In step S402 and step S403, the first server 110 transmits a first search command in the analysis command to the second server 120, and the second server 120 searches for the learning content data in the data storage device 130 according to the first search command. In step S404, the second server 120 obtains the searched learning content data from the data storage device 130. If there are multiple searched learning content data, for example, the second learning content data 131*b* and the third learning content data 131*c* shown in FIG. 1, then in step S405 and step S406, the second server 120 obtains a behavior data from the behavior database 133 in the data storage device 130 in order to compare and calculate a similarity between the behavior data (e.g., first keyword string) and the second learning content data 131*b*, and compare and calculate a similarity between the behavior data (e.g., first keyword string) and the third learning content data 131*c*. Then, generating a search list. Finally, in step S407, the second server 120 transmits the search list to the first server 110, and in step S408, the first server 110 displays the search list on the interface of the online learning system for the user to browse or download.

It will be apparent to those skilled in the art that various modifications and variations can be made to the structure of the present disclosure without departing from the scope or spirit of the present disclosure. In view of the foregoing, it is intended that the present disclosure cover modifications and variations of this present disclosure provided they fall within the scope of the following claims.

What is claimed is:

1. A data analysis method for searching learning sections, comprising steps of:
    receiving, by a first server, a plurality of learning content data, wherein the plurality of learning content data comprises a first learning content data and a different learning content data, the different learning content data is divided to a plurality of different learning sections, and the first learning content data and the different learning content data are in different formats;
    adding, by a second server, a plurality of first segmentation marks to the first learning content data to divide a plurality of first learning sections on the first learning content data;
    generating, by the second server, a first keyword string corresponding to each of the plurality of first learning sections according to each of the plurality of first learning sections;
    setting a first relevance tag on one of the plurality of first learning sections;
    setting a different relevance tag on one of the plurality of different learning sections;
    establishing a relevance between the one of the plurality of first learning sections and the one of the plurality of different learning sections;
    recording, by the first server or the second server, a plurality of user operations as a behavior data;
    receiving, by the second server, an analysis command related to one of the plurality of user operations, the analysis command being generated according to the behavior data when the one of the plurality of user operations corresponds to a default setting condition, wherein the default setting condition is browsing one of the plurality of learning content data for a time period;
    analyzing, by the second server, the analysis command with the first keyword string of each of the plurality of first learning sections to obtain a plurality of first similarities between the analysis command and the corresponding each of the plurality of first learning sections; and searching, by the second server, for a most similar first learning section to the analysis command, from the plurality of first learning sections;

wherein the data analysis method further comprises:

when the most similar first learning section is the one of the plurality of first learning sections with the first relevance tag, generating a recommendation list according to the one of the plurality of different learning sections with the different relevance tag, wherein the different relevance tag shares one or more similar words with the first relevance tag.

2. The data analysis method of claim 1, wherein the first learning content data comprises a literal data, and the data analysis method further comprises steps of:

analyzing the literal data to generate a plurality of feature strings, wherein the plurality of feature strings have a sequential relationship; and determining a similarity between the plurality of feature strings to generate the plurality of first segmentation marks.

3. The data analysis method of claim 1, wherein the first learning content data comprises a plurality of image screens, and the data analysis method further comprises a step of:

determining a similarity of the plurality of image screens to generate the plurality of first segmentation marks.

4. The data analysis method of claim 1, wherein the first learning content data comprises a literal data, and the data analysis method further comprises steps of:

analyzing the literal data to generate a plurality of feature words;

after dividing the plurality of first learning sections on the first learning content data, determining an amount of each of the plurality of feature words in each of the plurality of first learning sections; and setting the plurality of feature words, the amount of which is greater than a threshold value, as the first keyword string.

5. The data analysis method of claim 1, wherein the analysis command comprises a first search command, and the data analysis method further comprises steps of:

analyzing the first search command to generate a first search string; and calculating the plurality of first similarities between the analysis command and the corresponding each of the plurality of first learning sections according to the first search string.

6. The data analysis method of claim 5, further comprising a step of:

transmitting one of the plurality of first learning sections with the highest similarity and the corresponding first learning content data to a terminal device, and generating the behavior data accordingly.

7. The data analysis method of claim 6, further comprising a step of:

storing the first learning content data to a data storage device, wherein the data storage device comprises a second learning content data and a third learning content data, the second learning content data is divided into a plurality of second learning sections according to a plurality of second segmentation marks, and the plurality of second learning sections comprises a plurality of second keyword strings; the third learning content data is divided into a plurality of third learning sections according to a plurality of third segmentation marks, and the plurality of third learning sections comprises a plurality of third keyword strings.

8. The data analysis method of claim 7, further comprising steps of:

receiving a second search command;

searching for one or more sections from the second learning content data and the third learning content data from the data storage device according to the second search command;

calculating a plurality of second similarities between the first keyword string of the one of the plurality of first learning sections and the plurality of second keyword strings and third keyword strings; and adjusting an order of the second learning content data and the third learning content data according to the plurality of second similarities to generate a search list.

9. A data analysis system for searching learning sections, comprising:

a first server configured to receive a plurality of learning content data, wherein the plurality of learning content data comprises a first learning content data and a different learning content data, and the first learning content data and the different learning content data are in different formats;

a data storage device configured to receive and storage the first learning content data from the first server; and a second server configured to add a plurality of first segmentation marks to the first learning content data to divide a plurality of first learning sections on the first learning content data, add a plurality of different segmentation marks to the different learning content data to divide a plurality of different learning sections on the different learning content data, and configured to generate a first keyword string corresponding to each of the plurality of first learning sections according to each of the plurality of first learning sections; the second server further configured to receive an analysis command related to one of a plurality of user operations and analyze the analysis command with the first keyword string of each of the plurality of first learning sections to obtain a plurality of first similarities between the analysis command and the corresponding each of the plurality of first learning sections; the second server further configured to search for one of the plurality of first learning sections with a highest similarity from the plurality of first learning sections, wherein the plurality of user operations are recorded in the data storage device as a behavior data, and the first server is further configured to generate the analysis command according to the behavior data when the one of the plurality of user operations corresponds to a default setting condition, and the default setting condition is browsing one of the plurality of learning content data for a time period;

wherein the data analysis system is further configured to:

set a first relevance tag on one of the plurality of first learning sections;

set a different relevance tag on one of the plurality of different learning sections;

establish a relevance between the one of the plurality of first learning sections and the one of the plurality of different learning sections;

search, by the second server, for a most similar first learning section to the analysis command, from the plurality of first learning sections; and when the most similar first learning section is the one of the plurality of first learning sections with the first relevance tag, generate a recommendation list according to the one of the plurality of different learning sections with the different relevance tag, wherein the different relevance tag shares one or more similar words with the first relevance tag.

10. The data analysis system of claim 9, wherein the first learning content data comprises a literal data, and the second server further configured to analyze the literal data to generate a plurality of feature strings, wherein the plurality of feature strings have a sequential relationship; the second server further configured determine a similarity between the plurality of feature strings to generate the plurality of first segmentation marks.

11. The data analysis system of claim 9, wherein the first learning content data comprises a plurality of image screens, and the second server further configured to determine a similarity of the plurality of image screens to generate the plurality of first segmentation marks.

12. The data analysis system of claim 9, wherein the first learning content data comprises a literal data, and the second server further configured to analyze the literal data to generate a plurality of feature words; after dividing the plurality of first learning sections on the first learning content data, the second server further configured to determine a amount of each of the plurality of feature words in each of the plurality of first learning sections, and set the plurality of feature words, the amount of which is greater than a threshold value, as the first keyword string.

13. The data analysis system of claim 9, wherein the analysis command comprises a first search command; the second server further configured to analyze the first search command to generate a first search string, and calculate the plurality of first similarities between the analysis command and the corresponding each of the plurality of first learning sections according to the first search string.

14. The data analysis system of claim 13, wherein the second server further configured to transmit one of the plurality of first learning sections with the highest similarity and the corresponding first learning content data to a terminal device so as to generating the behavior data accordingly.

15. The data analysis system of claim 14, wherein the data storage device further stores a second learning content data and a third learning content data, the second learning content data is divided into a plurality of second learning sections according to a plurality of second segmentation marks, and the plurality of second learning sections comprises a plurality of second keyword strings; the third learning content data is divided into a plurality of third learning sections according to a plurality of third segmentation marks, and the plurality of third learning sections comprises a plurality of third keyword strings.

16. The data analysis system of claim 15, wherein the second server further configured to receive a second search command, and search for one or more sections from the second learning content data and the third learning content data from the data storage device according to the second search command; the second server further configured to calculate a plurality of second similarities between the first keyword string of the one of the plurality of first learning sections and the plurality of second keyword strings and third keyword strings, and adjust an order of the second learning content data and the third learning content data according to the plurality of second similarities to generate a search list.

17. The data analysis method of claim 1, wherein when the first learning content data is a video file with a predetermined length, the second server adds the first segmentation marks at times in the video file to divide the video file into the first learning sections of equal time length.

18. The data analysis method of claim 1, wherein when the first learning content data is a presentation file with a predetermined number of pages, the second server adds the first segmentation marks on pages of the presentation file to divide the presentation file into the first learning sections, each of the first learning sections having more than one of the pages of the presentation file.

19. A data analysis method for searching learning sections, comprising steps of:
receiving, by a first server, a plurality of learning content data, wherein the plurality of learning content data comprises a first learning content data and a different learning content data, the different learning content data is divided to a plurality of different learning sections, and the first learning content data and the different learning content data are in different formats;
adding, by a second server, a plurality of first segmentation marks to the first learning content data to divide a plurality of first learning sections on the first learning content data;
generating, by the second server, a first keyword string corresponding to each of the plurality of first learning sections according to each of the plurality of first learning sections;
setting a first relevance tag on one of the plurality of first learning sections;
setting a different relevance tag on one of the plurality of different learning sections;
establishing a relevance between the one of the plurality of first learning sections and the one of the plurality of different learning sections;
recording, by the first server or the second server, a plurality of user operations as a behavior data;
receiving, by the second server, an analysis command related to one of the plurality of user operations, the analysis command being generated according to the behavior data when the one of the plurality of user operations corresponds to a default setting condition, wherein the default setting condition is the user logging into of a data analysis system formed by the first server and the second server;
analyzing, by the second server, the analysis command with the first keyword string of each of the plurality of first learning sections to obtain a plurality of first similarities between the analysis command and the corresponding each of the plurality of first learning sections; and
searching, by the second server, for a most similar first learning section to the analysis command, from the plurality of first learning sections;
wherein the data analysis method further comprises:
when the most similar first learning section is the one of the plurality of first learning sections with the first relevance tag, generating a recommendation list according to the one of the plurality of different learning sections with the different relevance tag, wherein the different relevance tag shares one or more similar words with the first relevance tag.

* * * * *